Sept. 27, 1927.

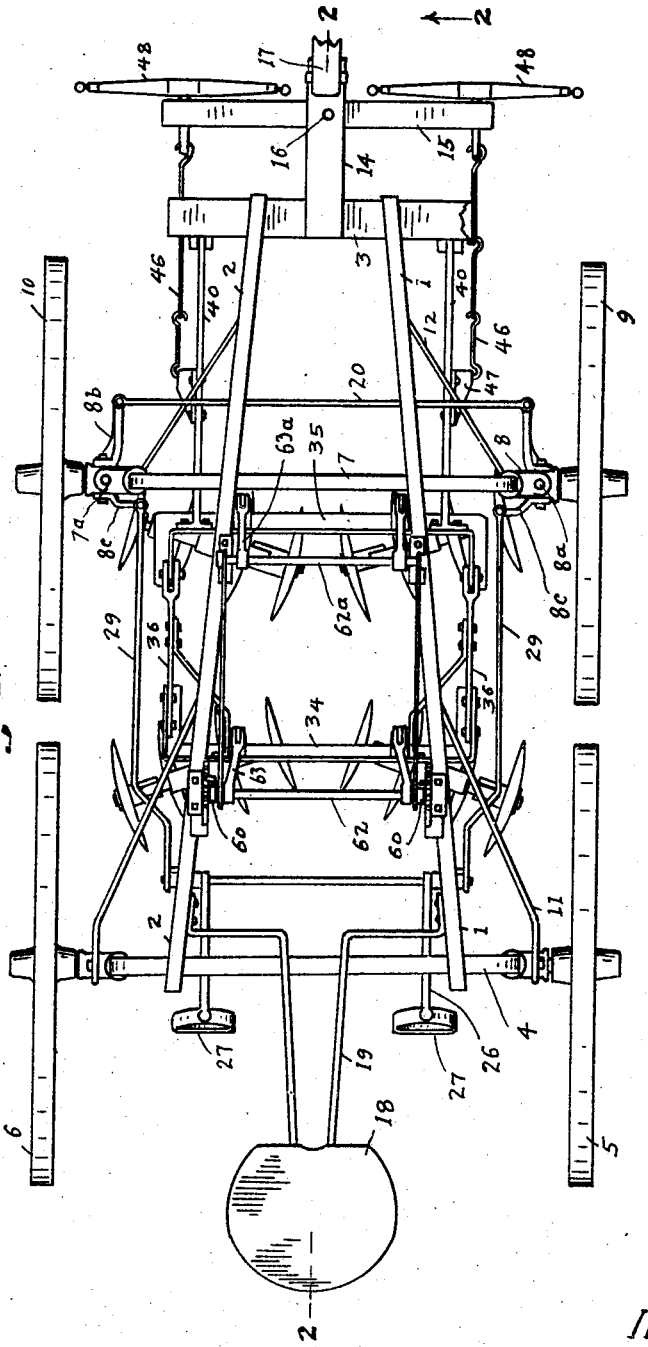

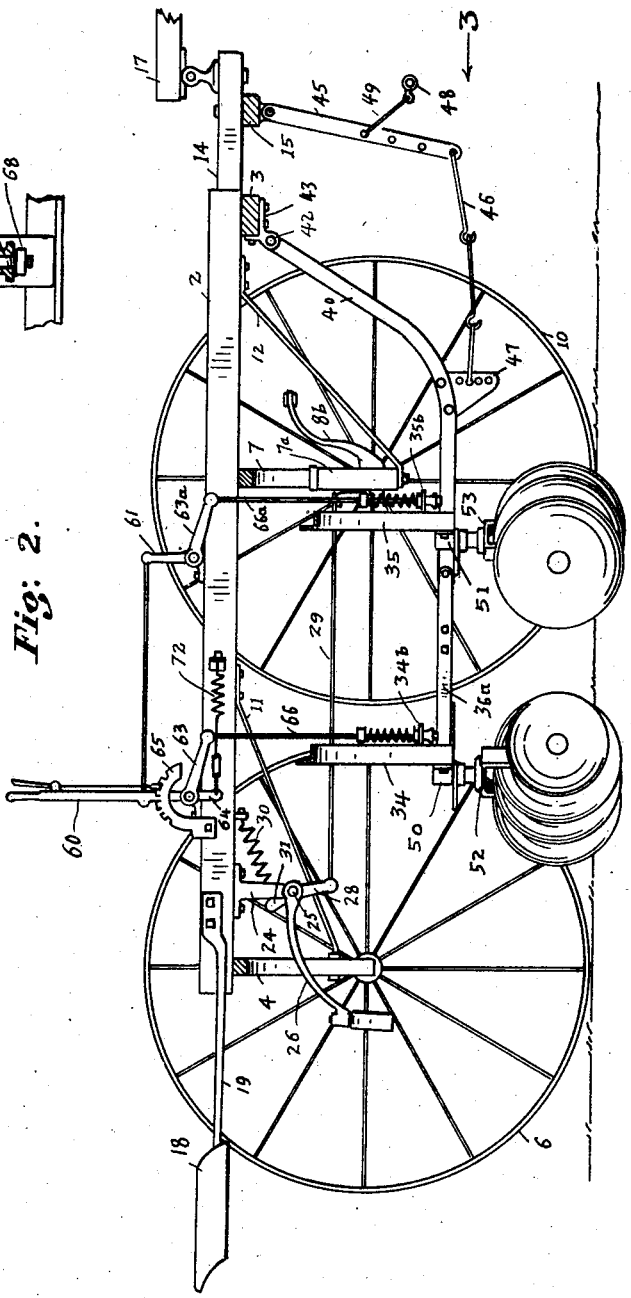
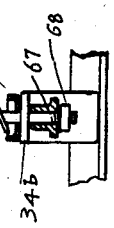

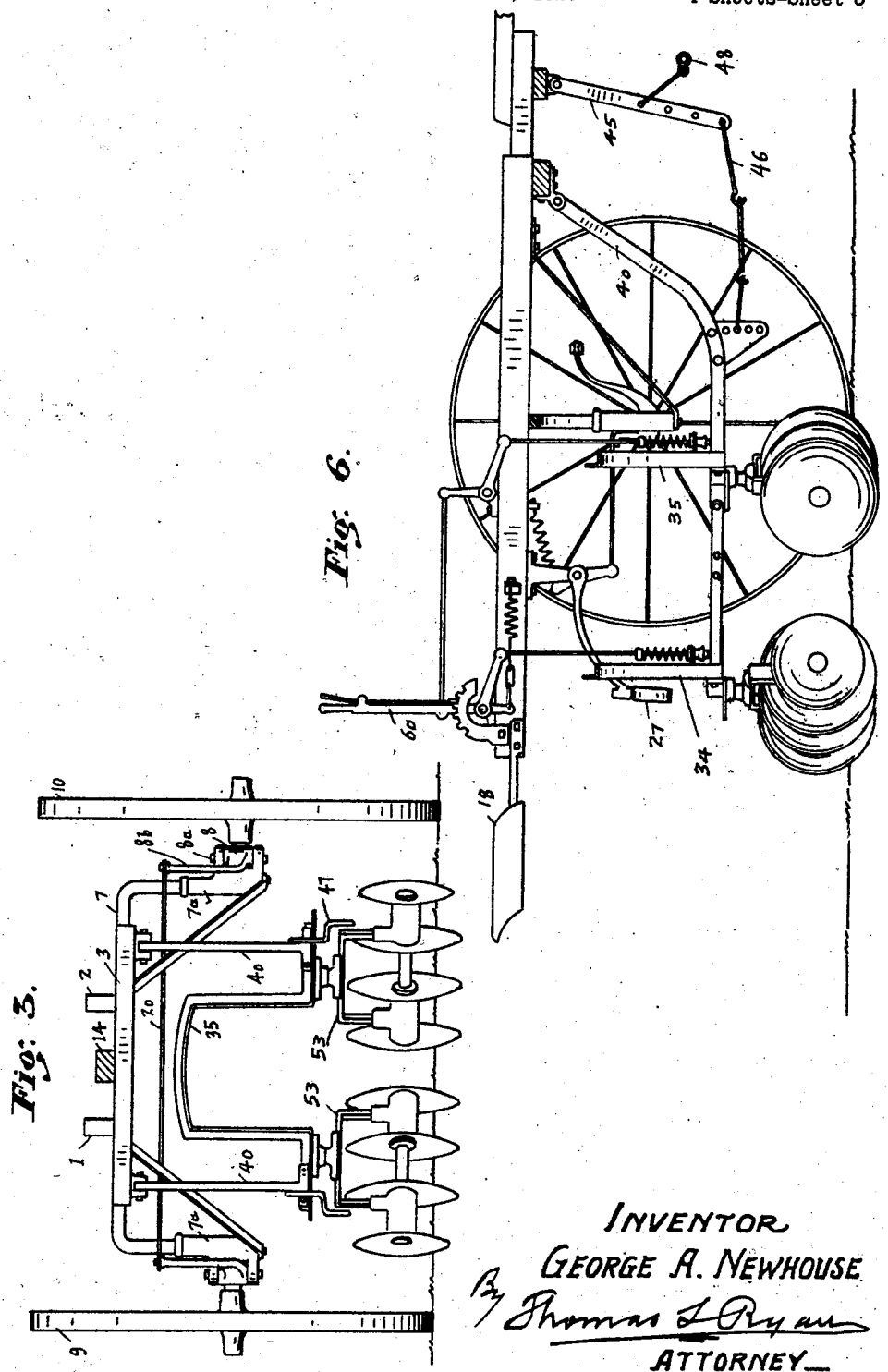

G. A. NEWHOUSE 1,643,898

CULTIVATING IMPLEMENT

Filed June 16, 1925

INVENTOR
GEORGE A. NEWHOUSE.
By Thomas L. Ryan
ATTORNEY.

Patented Sept. 27, 1927.

1,643,898

UNITED STATES PATENT OFFICE.

GEORGE A. NEWHOUSE, OF YORKTOWN, INDIANA, ASSIGNOR OF ONE-HALF TO ELMER E. PRILLAMAN, OF YORKTOWN, INDIANA.

CULTIVATING IMPLEMENT.

Application filed June 16, 1925. Serial No. 37,413.

This invention relates to improvements in cultivator implements known as disk harrows, and has especial reference to a harrow of that type which comprises two pairs of gangs of rotary disk shaped cutters, one pair of said gangs being arranged to operate at the rear of the other pair of gangs.

The disks of each gang are journaled on bearings that are carried by suitable yokes. Each yoke is connected to a gang frame capable of being drawn by horses or other suitable motive power.

In such machine the yokes are capable of being so set relatively to each other, that the disks of the rearward gangs will pulverize and level the ground which has been broken and thrown up by the disks of the forward gangs.

The construction of machines of this type has been improved by providing yieldable connections in the gang frame, and of adjustable connections for the gang yokes, so that the cutters may yield to the undulations of the ground surface, and whereby the gangs may be caused to operate in correct relation to each other.

While such a machine may be used in following a line of draft in the unplanted field, it is unwieldy and the direction of travel of the disks can be regulated only by the control constantly of the direction of travel of the horses.

The object of my present invention is to provide a cultivating implement of the kind described which is easy to operate and control and which is capable of so breaking the ground and of leveling same, and in which the direction of travel of the gangs, may be so controlled, that the ground may be cultivated to a line close to the growing crop, and the line of the planted row may be easily followed.

Other objects of the invention are to provide means whereby the disk gangs may be raised and lowered, and may be retained at raised position when desired.

The aforesaid general objects, and also the more specific purposes of the invention are accomplished by the new construction, combination and arrangement of parts shown in the accompanying drawings and described in the following specification. The invention is defined in the appended claims.

The several parts of my improved cultivating implement are identified by suitable characters of reference applied to same in the different views in the drawings, in which—

Figure 1 is a plan view of my improved cultivating implement.

Figure 2 is a vertical sectional view taken on the line 2—2 and as seen in direction of the arrow 2 in Figure 1.

Figure 3 is an end view of the machine, as seen in the direction of arrow 3, the tongue and draft bar connections not shown.

Figure 5 is an enlarged detail view of one of the support members for the gang frame.

Figure 6 is a modified form of machine in which my invention is embodied.

Figure 4:
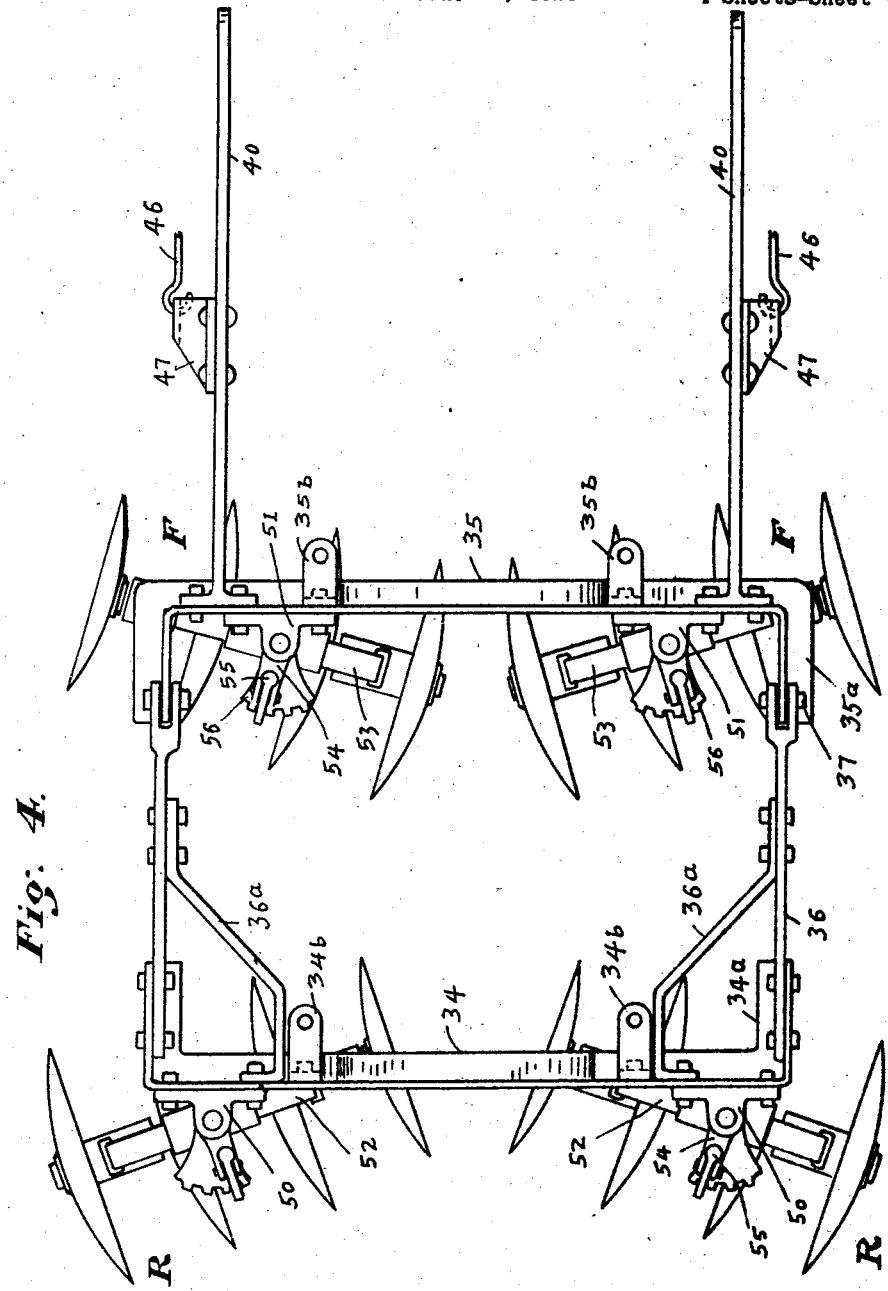
Figure 4 is an enlarged plan view of the gang frame and its connecting members.

My invention is embodied in a machine of the form and construction shown in the drawings; such machine consisting of a frame structure designated as the main frame, axle bars for the said frame and which axle bars are of arched formation, steering knuckles for one of the axle bars, wheels journaled on the spindles of the axle bars, and on the spindles of the knuckles, control devices for the steering knuckles, a gang frame whose cross members are arched, yoked gangs of disks connected to said gang frame, and adapted to be retained at relatively adjusted positions, connector arms between the gang frame and the main frame, a draw bar device swung from the front of the main frame, and loose connections between the connector arms and the said draw bar.

The said main frame consists of side members 1 and 2, whose forward portions are secured to a cross bar 3. The rear portions of said frame are secured to a cross member, which serves not only to retain the said side members but constitutes the rear axle bar 4. The outer portions of the axle bar are bent downwardly, and thence are turned outwardly and provided with spindles, upon which the wheels 5 and 6 are journaled. To the forward portion of the said frame is secured a front axle shaft 7. The end portions of this shaft are turned downwardly and are provided with head blocks 7ª to which steering knuckles 8 are journaled on vertical pins 8ª. On the spindles of these steering knuckles the front wheels 9 and 10 are journaled. Suitable braces 11 and 12 extend from the side members of the frame to the rear and front axle bars 4 and 7 respectively. A forwardly extended head bar 14 which is secured to the center of cross piece 3 of the frame forms a support upon which a tree-bar 15, is pivotally retained by a loose pin 16. At the front end of head bar 14, is loosely connected the tongue 17. A seat 18 for the operator is supported on bars 19 that are securely connected to the main frame members. Arms $8^b$ that extend from the knuckles 8 are loosely connected by a tie-rod 20, and a crank arm $8^c$ extends laterally from each of said knuckles. In bearing blocks 24, 24 which are secured to the side members of the main frame, the ends of a shaft 25 are journaled. Secured near each end of the shaft is a bell crank having a long arm 26 which is provided with a foot stirrup 27. The short arm 28 is loosely connected by a connector bar 29, to the crank arm $8^c$.

Springs 30 arranged between the main frame and arms 31 that are secured to shaft 25 operate to hold the knuckles normally in straight-ahead alignment.

In this present machine, and which is an embodiment of my invention as intended for the harrowing of the field in which the corn stalks may have reached a height of about thirty-four inches, the wheels 5, 6, 10 and 9 have a height of about 42 inches.

The plan of a disk gang frame, is shown in Figure 4. This frame consists of upright cross members 34 and 35 which are similar in structure and dimension. Each of these said members consists of an angle iron of arched form with its upper portion at the suitable height shown in Figure 3, the lower portions being horizontal, and the ends $34^a$ and $35^a$ being bent at a right angle. Secured to and extending forwardly from the member 34, is a side member 36 whose forward end is connected pivotally by pin 37 to the leg $35^a$ of the forward frame member 35. Secured to the end portions of the frame cross member 35, and extending forwardly and upwardly are connector arms 40, 40. The upper ends of these arms are connected by pins 42 loosely to a block 43 therefor secured to the cross piece 3 of the vehicle frame. Depending from the ends of the swiveled tree-bar 15 are draw bars 45, from whose lower portions, links 46, extend to and are held in hooked engagement with hook plates 47. A single tree 48 is supported loosely by a hook link 49 to the draw bar 45. While the draw of the main frame is at the tongue 17, the draw for the gang frame is at the single trees. It is obvious that by having a plurality of holes in the draw bar 45, and in the hook plate 47, adjustments may be so made that the draw from the single tree may be had in conformity with the height at which the disks are to be worked and with the nature of the ground that is to be traversed.

Spaced equidistant from the centers of the frame members 34 and 35 are fixed bearing blocks 50 and 51. Fixed studs that extend upwardly from the yokes 52 and 53 are journaled and retained in said bearing blocks. Means by which each of the yokes may be easily adjusted to the desired angle and there securely retained, may consist of arms 54 that are secured to said studs, each of which is provided with a pawl 55 that engages one of the notches in a sector plate 56 (which sector plate is secured to the bearing block).

Upon suitable shafts that are journaled in the yokes, 52 and 53, the disks are journaled; the frontal gangs being designated as gangs F, and the rearward gangs being designated as gangs R. The relative positions of these gangs are clearly shown in Figure 4, and they are seen at the lowered or operative position, in Figure 2. The rear portions of the gang frame are provided with brace bars $36^a$. Hand levers 60 which are fulcrumed on a shaft 62 which has its ends secured to the main frame, have the arms 63 and 64. Each of these levers is provided with the usual latching means and toothed sector 65. On a shaft $62^a$ which has its ends secured to the main frame are journaled bell cranks having arms 61 and $63^a$. Suspension members extend from the arms $63^a$, $63^a$ to the gang frame and are so arranged that the gang frame may be raised or lowered by manipulation of one or both the hand levers. These suspension rods 66 and $66^a$ have their upper ends connected loosely to the said arms $63^a$, $63^a$ and each have their lower ends passed through support clips $34^b$ and $35^b$ respectively of the gang frame. A detail of one of these suspension members is shown at Figure 5. A washer 67 loose on said rod underneath the clip, is retained by a nut 68. Loose on said rod and above the clip is a seat ring 69 in which is seated a coil spring 70 whose upper end has engagement with a collar 71 retained on rod 66 by a set screw.

When the disk frame is at a lowered position, the springs 70 exert a pressure against the clips $34^b$ and $35^b$ thereby providing a steadying pressure on the gang frame. A coil spring 72 whose forward end is secured to the frame member is connected to the short arm 64 of the hand lever, and by its tension, it minimizes the amount of exertion required of the operator in pulling the lever or levers rearwardly (to raise the gang frame).

When transporting the machine to the field that is to be cultivated, the disk gangs are at position suspended. At such suspended position the levers 60 will have been pulled rearwardly and in such movement the gang frame and disks are raised to sufficient height for the disks to clear the ground. The size and tension of the springs 72 may be varied and adjusted in conformity with the requirements of the operator. The angled positions of the disk gangs are plainly shown at Figure 4, the gangs F being directed toward, and the gangs R being directed away from the line of draft. The angle of inclination of these gangs may be varied and the disks may be worked at such depth in the soil as may be desired, according to the condition and nature of the soil and of the growing crop.

Advantages of my invention are that the growing crop may be given the benefit of the cultivating of the soil during the time from the planting, and until same will have reached the stage of growth when further cultivating for the season is unnecessary. With the gang frame cross members arched to the height shown, the stalks are cleared without injury. Cultivating of the soil to a line close to the growing stalks is practicable, and such a clear view of the line of draft is had by the operator, as the machine advances, that the work of cultivating is done rapidly and effectively, and without injury to the growing crop.

While the applied power for drawing the machine, is constant, and is effective at all times to move the disk gangs; the direction of the travel of the disk gangs is under positive control and they may be properly guided, according to the trend of the draft line, with only slight exertion by an operator of only ordinary skill.

The vehicle structure, and the draft structure, of the gang-mechanisms are so combined that while the applied power is fully effective in actuating the disks, the operator is supported at position where the crop row is at all times easily visible, and from whence he may, with easy effort, by simply guiding the vehicle by pressure of one or the other of his feet, in the stirrups 27, slightly to the right or left, cause the gangs to proceed on a line of travel whereby the soil is cultivated in conformity with the condition of the soil and with the variation of the line of the crop row.

To vary the height at which the disks are to be operated in the soil, or for raising the disks for the avoidance of obstructions, the operator simply uses the hand levers 60. By such control of the operation, and the positions of operation of the disks, no effort is necessary in the guidance of the horses.

The invention is embodied in a machine of the general proportions and of structure and detail as shown in the drawings, it will be understood that modifications may be made in the mechanical construction and arrangement of the several parts to suit the varied requirements the machine may be intended for. While the present machine is designed to be of width to cultivate on each side of a single row in the field, it is apparent that by modification of the main frame and the combining with same and its connected parts, additional sets of gangs, more than one row may be cultivated.

In the modification shown in Figure 6 will be seen the arrangement of the frame, and disk gang control members, where one axle bar, and one pair of axled wheels only, are used.

What I claim as my invention, and desire to secure by Letters Patent, is—

1. A machine of the kind described, comprising a wheeled vehicle frame having an arched axle bar, a gang frame disposed beneath the vehicle frame and at the rear of the axle bar thereof, a hinged connection between the front and rear of said gang frame, a steering means for the vehicle operable from a position at the rear of the gang frame, a connector member between the forward portion of the vehicle frame and each side of the front of the gang frame, means operable by the driver to raise or lower either side of each end of the gang frame, gangs of tools on the gang frame, draw bars depending from the forward portion of the vehicle frame, and flexible connections between the draw bars and the said connector members at a plane substantially coincident with the plane of the gang frame.

2. A machine of the kind described, comprising a wheeled main frame, an arched front axle bar and an arched rear axle bar, a steering means for the vehicle, operable from the driver's seat located at the rear of the rear axle bar, a gang frame at the rear of the front axle bar, a forward and rearward gang on each side of said gang frame, a cross tree pivoted on the frontal portion of the main frame, a draw bar depending from each end of said cross tree, flexible draft connections between said draw bars and the sides of the gang frame and loose connections between the gang frame and the main frame to maintain the gang frame against angular misalignment.

3. A machine of the kind described, comprising a wheeled main frame, an arched front axle bar and an arched rear axle bar, a gang frame disposed beneath the main frame and at the rear of the frontal axle bar thereof, a hinged connection between the front and rear of said gang frame, a steering means for the front wheels, operable from a seat on the vehicle main frame at position at rear of said gang frame, means operable by the driver to raise or lower either side of each end of the gang frame, a connector member between the forward portion of the vehicle frame and each side of the front portion of the gang frame, draw bars depending loosely from the forward portion of the vehicle frame, and link connections between the said draw bars and the said connector members at a plane substantially coincident with the plane of the said gang frame.

4. A machine of the kind described, comprising a wheeled vehicle frame having an arched axle bar, a gang frame disposed beneath the vehicle frame and at the rear of the axle bar thereof, a steering means for the vehicle, operable from a position at the rear of the gang frame, connector members loosely connected between the forward portion of the vehicle frame and each side of the front of the gang frame, means operable by the driver to raise or lower either side of each end of the gang frame, draw bars depending from the forward portion of the vehicle frame, and flexible connections between the draw bars and the said connector members.

GEORGE A. NEWHOUSE.